US006934262B1

(12) United States Patent
Lau et al.

(10) Patent No.: US 6,934,262 B1
(45) Date of Patent: Aug. 23, 2005

(54) METHOD AND APPARATUS FOR RESTRICTING THE ASSIGNMENT OF VLANS

(75) Inventors: Carmel Chi Him Lau, Petaluma, CA (US); Michael F. Davis, Penngrove, CA (US); Thomas E. Black, Jr., Santa Rosa, CA (US)

(73) Assignee: Cisco Technology, Inc., San Jose, CA (US)

( * ) Notice: Subject to any disclaimer, the term of this patent is extended or adjusted under 35 U.S.C. 154(b) by 761 days.

(21) Appl. No.: 09/750,180

(22) Filed: Dec. 29, 2000

Related U.S. Application Data

(60) Provisional application No. 60/228,102, filed on Aug. 26, 2000.

(51) Int. Cl.⁷ .............................................. H04L 12/28
(52) U.S. Cl. ....................... 370/256; 370/392; 370/400
(58) Field of Search ........................ 370/392, 400–402, 370/255, 256, 409, 395–395.54, 276; 709/236, 709/220, 221, 239, 242, 228; 703/1–3

(56) References Cited

U.S. PATENT DOCUMENTS

| 5,751,967 | A | * | 5/1998 | Raab et al. .................. 709/228 |
| 5,825,772 | A | * | 10/1998 | Dobbins et al. ............. 370/396 |
| 5,878,232 | A | * | 3/1999 | Marimuthu .................. 709/249 |
| 6,032,194 | A | | 2/2000 | Gai et al. |
| 6,061,334 | A | * | 5/2000 | Berlovitch et al. ......... 370/255 |
| 6,181,699 | B1 | * | 1/2001 | Crinion et al. .............. 370/392 |
| 6,188,694 | B1 | | 2/2001 | Fine et al. |
| 6,223,218 | B1 | * | 4/2001 | Iijima et al. ................. 709/221 |
| 6,331,983 | B1 | * | 12/2001 | Haggerty et al. ........... 370/400 |
| 6,338,995 | B1 | | 1/2002 | Hwang et al. |

(Continued)

OTHER PUBLICATIONS

Larry Peterson et al., "Computer Networks", 2000, Morgan Kaufman Publishers, San Francisco, California, pp. 186-198.

IEEE Standard for Information Technology—Telecommunications and Information Exchange Between Systems—Local and Metropolitan Area Networks—Common Specifications, Part 3: Media Access Control (MAC) Bridges, ANSI/IEEE Sld 802.1D, 1998 Edition, The Institute of Electrical and Electronics Engineers, Inc., New York, Dec. 10, 1998, pp. 1-355.

(Continued)

*Primary Examiner*—Bob Phunkulh
*Assistant Examiner*—Ian N. Moore
(74) *Attorney, Agent, or Firm*—Ritter, Lang & Kaplan

(57) ABSTRACT

Restricting the assignment of VLANs so that a unique VLAN or set of VLANs must be assigned to each link for a particular network circuit (NC) or group of NCs. NCs are prevented from being assignd a particular VLAN if the addition of the VLAN assignment will create a mix-match topology, which may either create a loop or prevent a loop from being able to be properly blocked without inadvertently blocking a link of another NC. Restriction of VLAN assignment allow a single conventional spanning tree to be run to ensure that there are no layer 2 forwarding loops exist while at the same time not inadvertently blocking the path of another NC.

20 Claims, 14 Drawing Sheets

U.S. PATENT DOCUMENTS

| | | | |
|---|---|---|---|
| 6,460,088 B1 * | 10/2002 | Merchant | 709/236 |
| 6,515,969 B1 | 2/2003 | Smith | |
| 6,519,231 B1 * | 2/2003 | Ding et al. | 370/256 |
| 6,560,236 B1 * | 5/2003 | Varghese et al. | 370/401 |
| 6,578,021 B1 * | 6/2003 | Barillaud | 706/20 |
| 6,665,733 B1 * | 12/2003 | Witkowski et al. | 709/249 |
| 6,697,338 B1 * | 2/2004 | Breitbart et al. | 370/254 |
| 6,714,549 B1 * | 3/2004 | Phaltankar | 370/397 |
| 6,757,286 B1 | 6/2004 | Stone | |
| 2002/0009092 A1 * | 1/2002 | Seaman et al. | 370/406 |

OTHER PUBLICATIONS

IEEE Standards for Local and Metropolitan Area Networks: Virtual Bridged Local Area Networks, IEEE Std 802.1Q-1998, The Institute of Electrical and Electronics Engineers, Inc. New York, Mar. 8, 1999, pp. 1-199.

* cited by examiner

METHOD AND APPARATUS FOR RESTRICTING THE ASSIGNMENT OF VLANS

This application claims priority under 35 U.S.C. §119(e) for provisional application No. 60/228,102 filed on Aug. 26, 2000.

BACKGROUND OF THE INVENTION

Telecommunications (telecom) systems are carrying increasing amounts of information, both in long distance networks as well as in metropolitan and local area networks (MAN/LAN). At present, data traffic is growing much faster than voice traffic, and includes high bandwidth video signals. In addition to the requirement for equipment to carry increasing amounts of telecom traffic there is a need to bring this information from the long distance networks to businesses and to locations where it can be distributed to residences over access networks.

The equipment, which has been developed to carry large amounts of telecom traffic, includes fiber optic transport equipment that can carry high-speed telecom traffic. The data rates on fiber optic systems can range from millions of bits per second (Mb/s) to billions of bits per second (Gb/s). In addition, multiple wavelengths of light can be carried on an optical fiber using Wavelength Division Multiplexing (WDM) techniques.

The use of optical fibers allows large amounts of telecom traffic to be transported over long distances. However, as one of ordinary skill in the art would recognize, it is impossible to have direct connections from each device sending data to each device receiving data. Moreover, some of the data being transmitted from a particular device may be intended for an intermediate point while other data is destined for a final point. Furthermore, the intermediate point may also wish to transmit data to the final point. The optical fibers provide a high-speed data stream (pipeline) upon which to transmit data traffic from a plurality of devices to a plurality of other devices.

Thus, telecom networks utilize network elements (NEs) that act as nodes in the transportation of data. The nodes may be nothing more than an intermediate point for data, may be a destination point for data, or may be a point where data is added to and removed from the data stream. NEs capable of providing this functionality, adding and removing traffic, are referred to as "add-drop" multiplexers (ADMs).

ADMs include multiple interface cards which receive high-speed data streams, create a time division multiplex (TDM) signal containing the multiple data streams, and route the time division multiplex signal to a cross-connect unit which can disassemble the data streams, remove or insert particular data streams, and send the signal to another interface card for transmission back into the networks. Because the multiple data streams are aggregated into a TDM data signal, the data rate of the TDM signal is by definition several times the maximum data rate supported by the interface cards.

Standardized interfaces and transmission hierarchies for telecom signals have been developed and include Pleisochronous Digital Hierarchy (PDH), Synchronous Digital Hierarchy (SDH), and Synchronous Optical Network (SONET). In addition to these telecom transport standards, standards have been developed for interconnecting businesses and computers within businesses. These Metropolitan and Local Area Network (MAN/LAN) standards include Ethernet, Gigabit Ethernet, Frame Relay, and Fiber Distributed Data Interface (FDDI). Other standards, such as Integrated Services Digital Network (ISDN) and Asynchronous Transfer Mode (ATM) have been developed for use at both levels.

FIG. 1 illustrates a simple telecommunications network 100 consisting of first and second computers 110, 112. The first computer 110 is connected to a first NE 120, and the second computer 112 is connected to a second NE 122. The first and the second NEs 120, 122 are connected together with links 130, 132, wherein the links may be fiber optic cables. That is, the links 130, 132 form pipelines between the NEs 120, 122. However, the two links 130, 132 form a layer-2 forwarding loop that renders the telecom network 100 inoperable. That is, each NE 120, 122 will continually transmit data over both links 130, 132 and respond to the receipt of data over both links 130, 132. Eventually, the amount of excess traffic created by this situation floods the network 100 with traffic. One way to prevent the layer-2 forwarding loop is to use spanning tree for the telecom network 100.

As one of ordinary skill in the art knows, spanning tree is a standard bridge-to-bridge protocol used to prune a network into a tree by putting redundant links in "blocking" (sleeping) mode. Spanning tree is defined in IEEE Standard 802.1D, which is herein incorporated by reference. The blocked link would not forward traffic unless the working (non-blocked) link is lost. For example, if the first link 130 was the first link to transfer data between the NEs 120, 122, the second link 132 would effectively be blocked.

As one of ordinary skill in the art would recognize, there may be multiple links between two NEs for a specific reason other than redundancy. For example, a first link between NEs may provide a pipeline with a first data rate, such as OC-48, and the second link may provide a pipeline with a second data rate that is higher than the first data rate, such as OC-192. As would be obvious to one of ordinary skill in the art, the higher-speed connections cost more than the lower speed connections. As such, some customers may only pay for connections of the first data rate while other customers may pay for the higher data rate connection.

Thus, there is a need to separately identify the different links between NEs. The current and preferred method for differentiating links between NEs is to assign each unique link to a different virtual LAN (VLAN). Current NEs support the assignment of VLANs to the links of the NE. The operation of VLAN NEs is defined in IEEE Standard 802.1Q, which is herein incorporated by reference, but is not admitted to be prior art.

FIG. 2A illustrates a telecom network 200 that includes first, second, third, and fourth computers 210, 212, 214, 216. The first and second computers 210, 212 are connected to a first NE 220, and the third and fourth computers 214, 216 are connected to a second NE 222. The first and the second NEs 220, 222 are connected together with links 240, 242, wherein the links are preferably fiber optic cables but may be copper cables or other type of cables capable of transmitting data at high speeds. The first link 240 supports OC-192 data streams while the second link 242 supports only OC-48 data streams. The first link 240 is identified as VLAN-A and the second link 242 is identified as VLAN-B.

Some customers may require the speed of an OC-192 pipeline while others may only require, or be able to justify the cost of, an OC-48 pipeline. The pipeline used by the customers will depend on the services provided by the customers. That is, each customer will select a link that provides an acceptable data rate at an acceptable price.

For example, as illustrated in FIG. 2B, a first customer 250 might use the first computer 210 and the third computer 214, and a second customer 252 may use the second computer 212 and the fourth computer 216. The first customer 250 uses the first link 240 that provides the OC-192 data rate, while the second customer 252 uses the second link 242, supporting OC-48 communications. To differentiate the two links, the first link is identified as VLAN-A 260 and the second link is identified as VLAN-B 262. Thus, when data is transmitted by the first customer 250 (to/from the first computer or the third computer 210, 214), the data will be transmitted over the first link 240 identified as VLAN-A 260. Likewise, when data is transmitted from the second customer 252 (to/from the second computer or the fourth computers 212, 216), the data will be transmitted over the second link 242 that is identified as VLAN-B 262.

If a single spanning tree protocol is used between the two NEs of FIG. 2B, the spanning tree protocol will assume that there is a forwarding loop and block one of the links. In fact, there is not a forwarding loop as each link is a different VLAN. The solution is to run two separate spanning tree protocols between the NEs. That is, run a separate spanning tree protocol for each link, since each link is associated with a separate VLAN. Stated alternatively, a separate spanning tree is run for each VLAN, since each VLAN is associated with a separate link. Thus, each spanning tree only sees a single link (as opposed to a loop) and does not block any of the traffic inadvertently.

However, a typical telecom network is not as simple as that illustrated in FIGS. 1-2. The typical telecom network will consist of multiple NEs and multiple links between the NEs. Each of the links will have data from various sources being transferred over it.

For example, FIG. 3A illustrates an exemplary telecom network 300 that consists of two NEs (NE1, NE2) and three links (310, 312, 314) therebetween, and provides communications between two sets of customers (C1, C2). NE1 connects to C1 320 and C2 330 and NE2 connects to C1 322 and C2 332. C1 320 and C2 322 communicate over links 312, 314, which are both designated as VLAN-A. Therefore, one of the links 312, 314 would be blocked when running spanning tree on VLAN-A so as to prevent a layer-2 forwarding loop. C2 330 and C2 332 communicate over links 310, 312, which are both designated as VLAN-B. Therefore, one of the links 310, 312 would be blocked when running spanning tree for VLAN-B.

The telecom network 300 illustrates a situation where link 312 is designated as both VLAN-A and VLAN-B. IEEE standard 802.1Q does not provide a standard for assigning spanning tree protocols to such arbitrary topologies. The assignment of spanning tree protocols is normally a function left to the individual deployer of an NE. As one of ordinary skill in the art would recognize, this assumes expertise and diligence on the part of the user. Moreover, there is no standard for handling the assignment of multiple VLANs to a single link, which is likely to be a common occurrence (as is the case with the telecom network of FIG. 3A).

This type of mismatch topology leaves a network operator with a dilemma. If the network operator runs a separate spanning tree for each different VLAN assignment, then none of the links would be blocked as each link has a different VLAN assignment (310-VLAN-A, 312-VLAN-A/B, and 314-VLAN-A). Furthermore, if the network operator ran the same spanning tree on links 310, 312 (i.e., same spanning tree for VLAN-B and VLAN-A/B) it is possible that a VLAN-A layer-2 forwarding loop would remain if link 310 was put in blocking mode. Alternatively, if the network operator ran the same spanning tree on links 312, 314 (i.e., same spanning tree for VLAN-A and VLAN-A/B) it is possible that a VLAN-B layer-2 forwarding loop would remain if link 314 was put in blocking mode.

As an additional example FIG. 3B illustrates an exemplary telecom network 350 that consists of six NEs (NEs 1-6) and six links 352, 354, 356, 358, 360 therebetween. Four distinct network circuits (NC1–NC4) are defined in the telecom network 350. NC1 connects NE1, NE2, and NE5; NC2 connects NE2, NE3 and NE6; NC3 connects NE4, NE3, and NE5; and NC4 connects NE2, NE3 and NE5. The links of NC1 are assigned as VLAN-A, the links of NC2 are assigned VLAN-B, the links of NC3 are assigned VLAN-c, and the links of NC4 are assigned VLAN-D. This leaves a topology where the links have the following VLAN assignments.

| Links | VLAN |
| --- | --- |
| 352 | A |
| 354 | A/D |
| 356 | B/D |
| 358 | C/D |
| 360 | C |
| 362 | B |

As illustrated, NC4 is a loop that needs to properly have spanning tree performed so as to prevent a layer-2 forwarding loop. However, each of the links 354, 356, 358 of NC4 is transmitting data in addition to the data associated with NC4. A network operator is burdened with attempting to figure out how to effectively run spanning tree so as to prevent a layer-2 forwarding loop at the same time as not inadvertently blocking an active path.

For example, if the operator assigned a separate spanning tree to each unique set of VLANs, the loop would not be blocked as each of the links within the loop have different VLAN assignments. Alternatively, if the operator assigned each link associated with NC4 the same spanning tree, one of the links 354, 356, 358 (forming the loop) would be blocked. Blocking one of these links will inadvertently block NC1, NC2, or NC3 data being transmitted over that link.

Thus, there is a need for a method and apparatus for restricting the assignment of VLANs. The method and apparatus needs to prevent different NCs from being assigned VLANs that will either create a loop or prevent a loop from being able to be properly blocked without inadvertently blocking a link of another NC. If the assignment of VLANs is properly implemented, then a single conventional spanning tree can be run for the each unique VLAN to ensure that there are no layer 2 forwarding loops while at the same time not inadvertently blocking the path of another NC.

SUMMARY OF THE INVENTION

The present invention discloses a method, computer program, apparatus and network device for restricting the assignment of VLANs so that a unique VLAN or set of VLANs must be assigned to each link for a particular network circuit (NC) or group of NCs. NCs are prevented from being assignd a particular VLAN if the addition of the VLAN assignment will create a mix-match topology, which may either create a loop or prevent a loop from being able to be properly blocked without inadvertently blocking a link of another NC. The method and apparatus (i.e., restriction of VLAN assignment) allow a single conventional spanning tree to be run to ensure that there are no layer 2 forwarding loops exist while at the same time not inadvertently blocking the path of another NC.

According to one embodiment, a method, computer program and apparatus for receiving information regarding creation of a network circuit is disclosed. The method includes receiving information regarding assignment of a test VLAN to the created network circuit. Provisioning data including presence of other network circuits and assignments of VLANS to the other network circuits is retrieved. A determination is made if the test VLAN intersects entirely with any of the other assigned VLANs and if the test VLAN is distinct from all the other assigned VLANs. A determination is made if the test VLAN is acceptable based on the determining if the test VLAN intersects entirely and the determining if the test VLAN is distinct.

According to one embodiment, a method and computer program for defining a new network circuit for the network element is disclosed. The method includes assigning a test VLAN to the new network circuit. Assignments of VLANs to other defined network circuits associated with the network element is determined and a spanning tree is associated to the test VLAN if the test VLAN intersects entirely with one of the other VLANs, wherein the assigned spanning tree will be identical to a spanning tree associated with the one of the other assigned VLANs.

According to one embodiment, a method and computer program for defining a new network circuit for the network element is disclosed. The method includes assigning a test VLAN to the new network circuit. Assignments of VLANs to other network circuits associated with the network element is determined. A new spanning tree is associated to the test VLAN if the test VLAN is completely distinct from all of the other VLAN assignments.

According to one embodiment, a network device for preventing a network from having a topology with partially intersecting VLANs is disclosed. The network device includes a memory and one or more network interfaces. The network device also includes a processor configured to perform the steps of defining a new network circuit for the network device, assigning a test VLAN to the new network circuit, determining assignments of VLANs to other network circuits associated with the network device and determining if the test VLAN is acceptable.

These and other features and objects of the invention will be more fully understood from the following detailed description of the preferred embodiments, which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings.

DETAILED DESCRIPTION OF THE PREFERRED EMBODIMENTS

Figure 1:
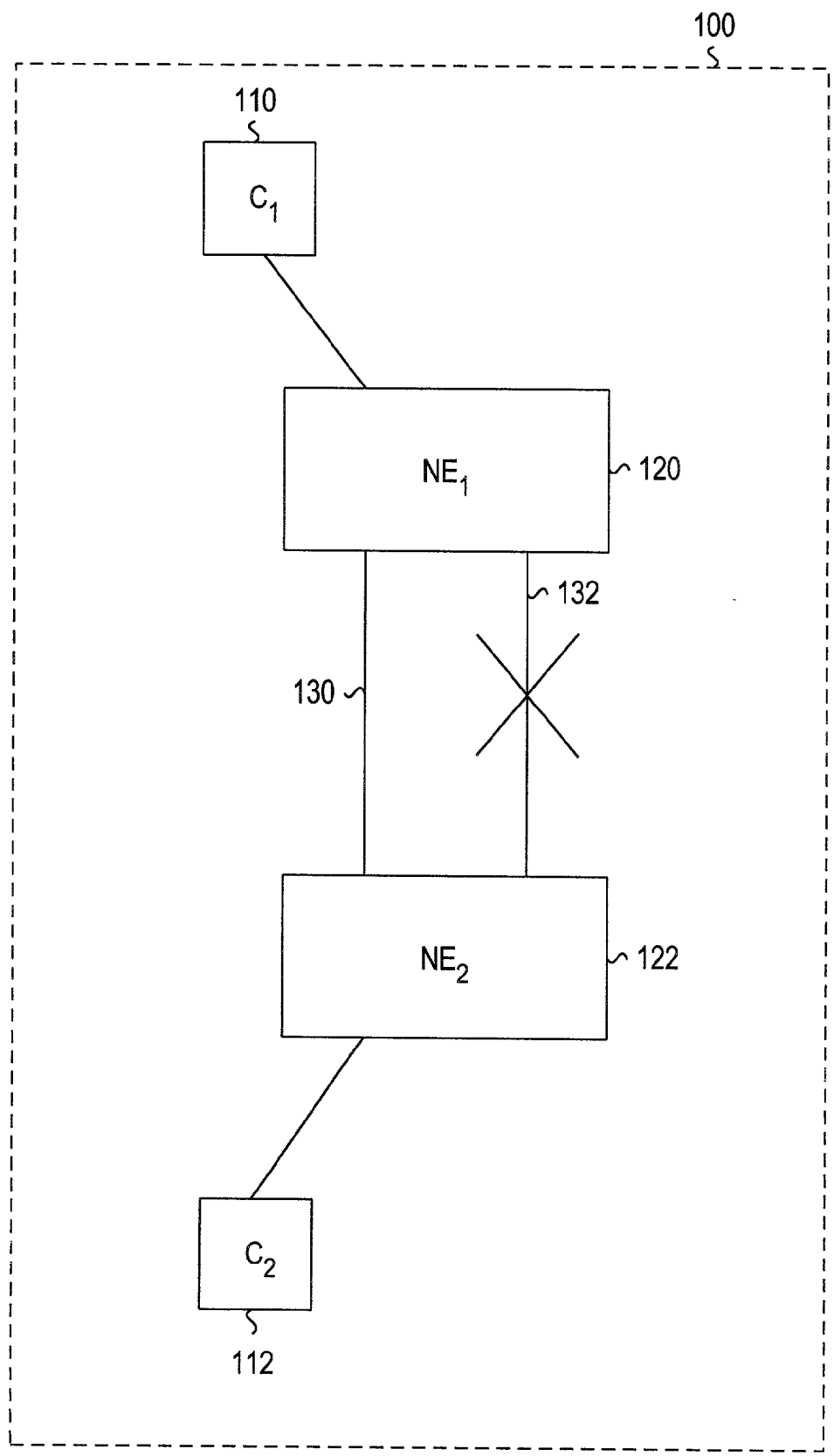
FIG. 1 illustrates a simple telecommunications (telecom) network consisting of a single network circuit.
Figure 2A:
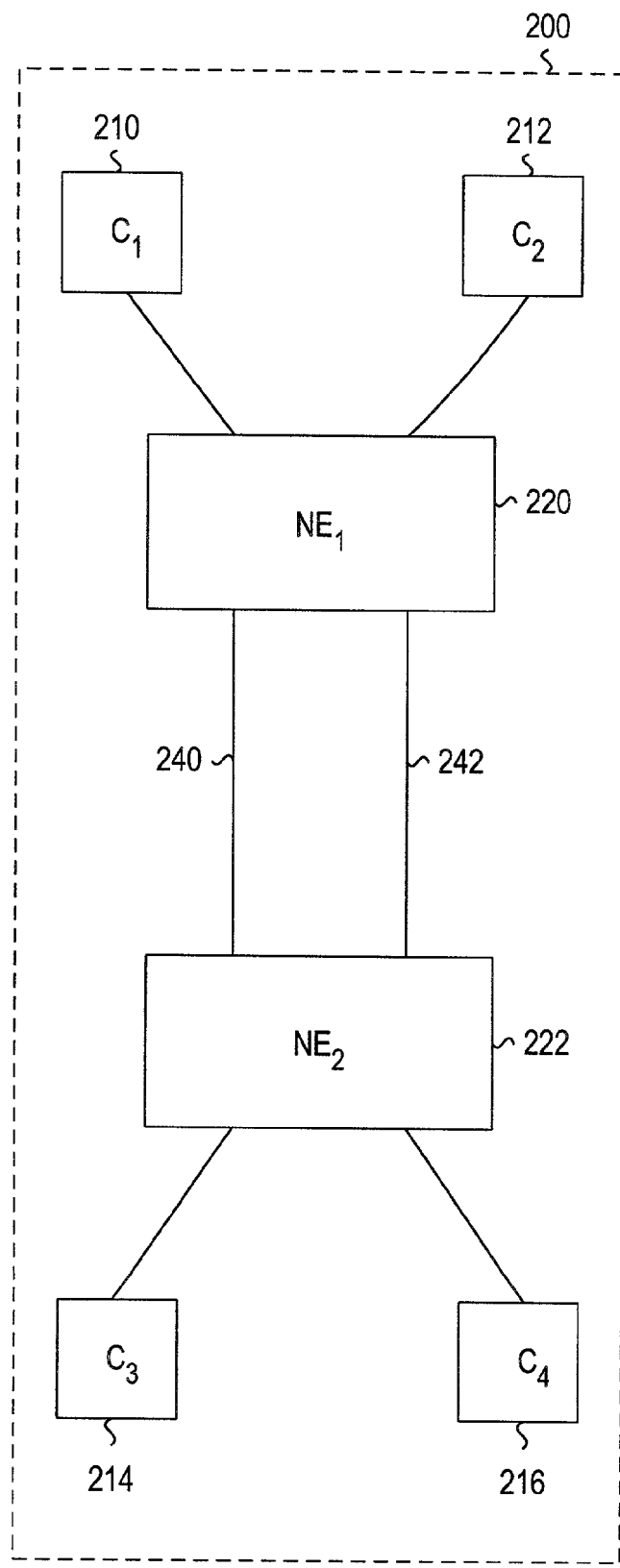
FIG. 2A illustrates a simple telecom network consisting of two network circuits.
Figure 2B:
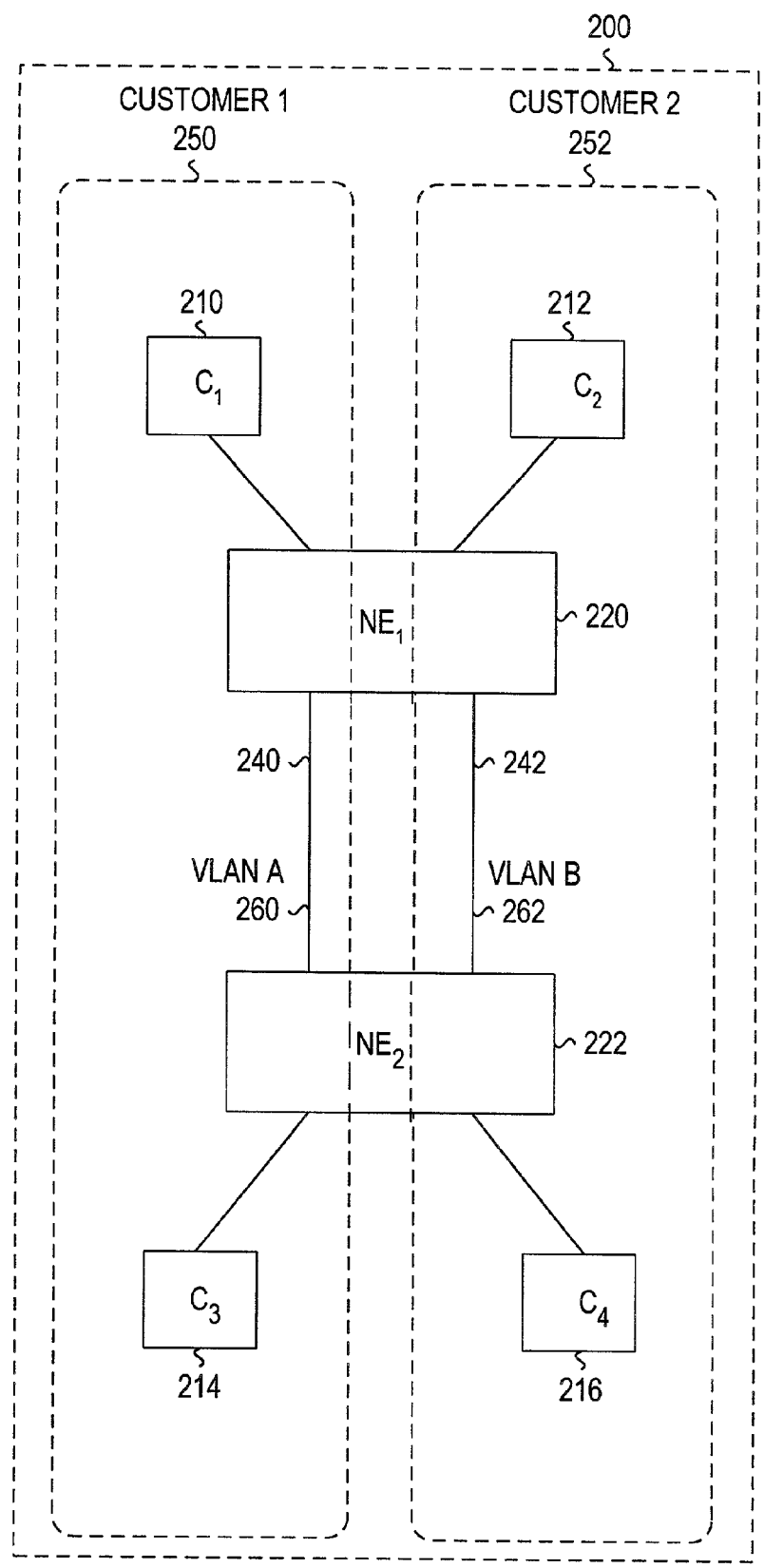
FIG. 2B illustrates users and VLAN assignments for the telecom network of FIG. 2A.

In describing a preferred embodiment of the invention illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose.

With reference to the drawings, in general, and FIGS. 4 through 7 in particular, the apparatus and method of the present invention are disclosed.

Numerous telecommunications (telecom) and networking standards, including the following that are incorporated herein by reference, are used to transport data.

Bellcore Standard GR-253 CORE, Synchronous Optical Network (SONET) Transport Systems: Common Generic Criteria, Issue 2, December 1995;

Bellcore Standard GR-1400 CORE, SONET Uni-directional Line-Switched Ring Equipment Generic Criteria;

Bellcore Standard GR-1230 CORE, SONET Bi-directional Line-Switched Ring Equipment Generic Criteria, Issue 3A, December 1996;

Bellcore TR-NWT-000496, SONET Add-Drop Multiplex Equipment (SONET ADM) Generic Criteria, Issue 3, May 1992;

Bellcore Transport System Generic Requirements FR-440, Issue No. 98, September 1998;

Networking Standards, by William Stallings, published by Addison-Wesley Publishing Company (New York, 1993);

IEEE/ANSI Standard 802.3, Ethernet LAN specification;

IEEE Standard 802.1D bridge-to-bridge protocol; and

IEEE Standard 802.1Q, VLAN-aware bridges.

When a new Network Element (NE) is installed in a telecommunications (telecom) network, it will be connected to various links, such as fiber optic cables, from other NEs. The NE will likely consist of a plurality of interface cards, a control unit and a cross-connect. The interface cards are likely to be a combination of telecom cards, for communicating with the telecom network, and data cards for communicating with devices connected either directly to the NE or connected to the NE through a Metropolitan or Local Area Network (MAN/LAN). The control unit controls the operation of the NE and the cross connect routes data streams from one card to another so that the data streams are transmitted to the appropriate places within the telecom network. It can thus be said that the NE is a flexible cross-connect system.

Figure 4A:
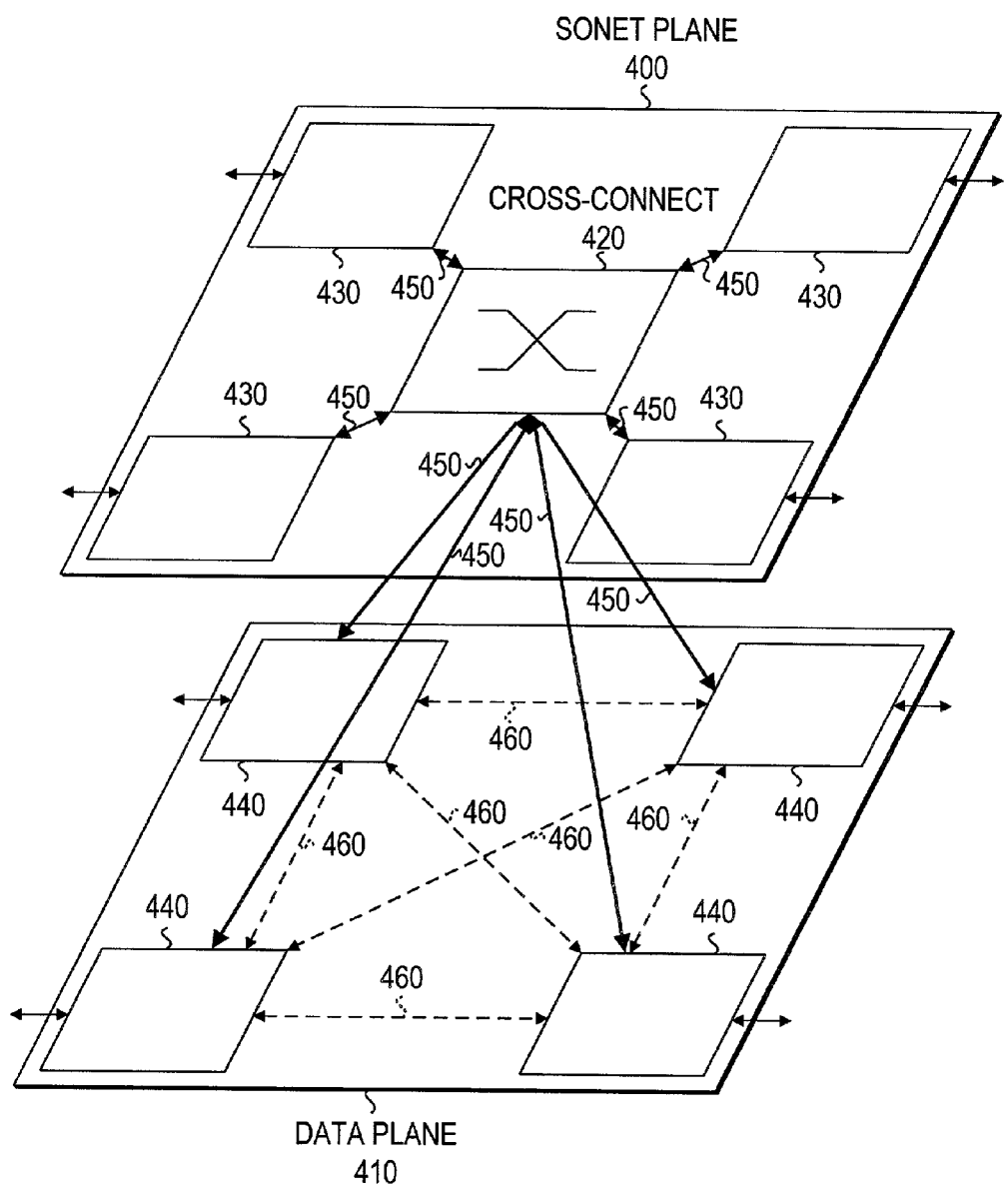
FIG. 4A illustrates a block diagram of the flexible cross-connect system, according to one embodiment.

FIG. 4A illustrates a block diagram of a NE capable of routing traffic across two high-bandwidth planes. The NE includes a telecom plane 400, such as a SONET plane, and a data plane 410. The telecom plane 400 includes network interface subsystems 430, and the data plane 410 includes network interface subsystems 440. A centralized fully non-blocking cross-connect unit (XC) 420 is located in the telecom plane 400, which interfaces with the network interface subsystems 430 and the network interface subsystems 440.

Standardized telecom traffic, such as SONET, Synchronous Digital Hierarchy (SDH), Pleisochronous Digital Hierarchy (PDH), or other Time Division Multiplexed (TDM) or Wavelength Division Multiplexed (WDM) traffic, enters the system through the network interface subsystems 430, such as electrical or optical interface subsystems. The telecom traffic is transmitted from the network interface subsystems 430 over point-to-point connections 450 to the XC 420. The XC 420 processes the telecom traffic and then transmits the processed data back to a telecom network, such as a Wide Area Network (WAN), or transmits the processed data to a data network, such as a Metropolitan or Local Area Network (MAN/LAN). The processed data is transmitted to the telecom network via the network subsystem(s) 430, and to the data network via the network interface subsystem(s) 440.

Standardized data traffic, such as Ethernet, enters the system through the network interface subsystems 440, such as electrical or optical interface subsystems. The network interface subsystems 440 communicate with the XC 420 via point-to-point connections 450. The data plane 410 also allows for communications between network interface subsystems 440 via point-to-point connectors 460. Thus, the data traffic can be processed by multiple interface subsystems 440 before being transmitted to the XC 420 or back to the data network. As with the telecommunication traffic, the XC 420 processes the data traffic and transmits the processed data to a telecommunication network or a data network.

Figure 4B:
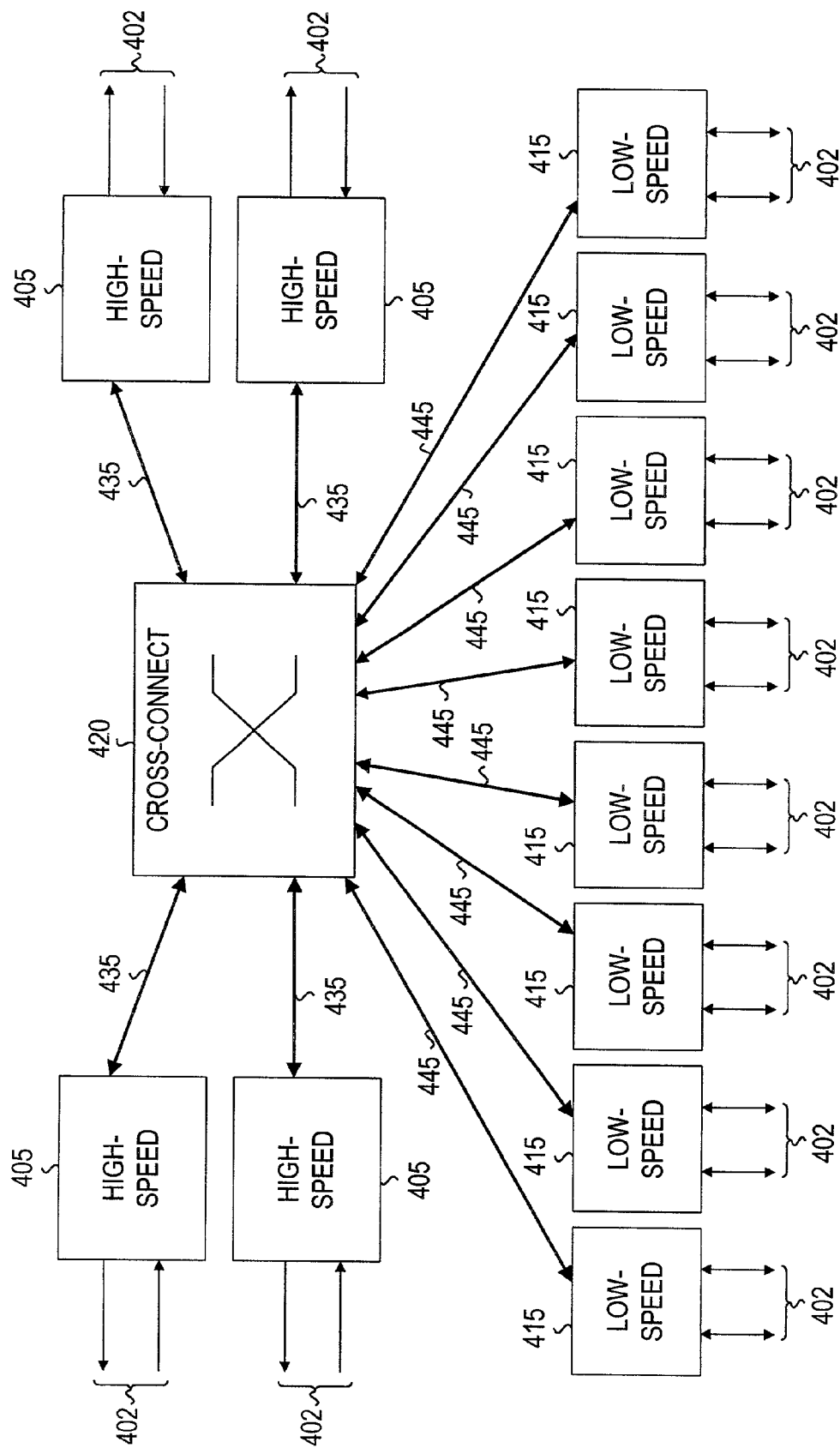
FIG. 4B illustrates a functional diagram of the flexible cross-connect system, according to one embodiment.

According to one embodiment, as illustrated in FIG. 4B, specific network interface subsystems are designated as high-speed interface subsystems 405 and others are designated as low-speed interface subsystems 415 having corresponding high-speed connections 435 and low-speed connections 445 to the XC 420. For example, the low-speed interconnections 445 may operate at the STS-48 rate of 2.488 Gb/s, while the high-speed interconnections 435 may operate at the STS-192 rate of 9.953 Gb/s.

The high speed network interface subsystems 405 may be realized as printed circuit boards containing active and passive electrical and optical components, and may contain multiple network interfaces 402 operating at the same or different speeds. The low speed network interface subsystems 415 may also be realized as printed circuit boards with active and passive electrical and optical components, and can contain multiple network interfaces 402 operating at the same or different speeds. As an example, a low speed network interface subsystem 415 can be realized as a DS-1 interface board supporting 14 DS-1 interfaces. Alternatively, a low speed network interface subsystem 415 can be realized as an Ethernet board supporting multiple Ethernet interfaces.

Figure 4C:
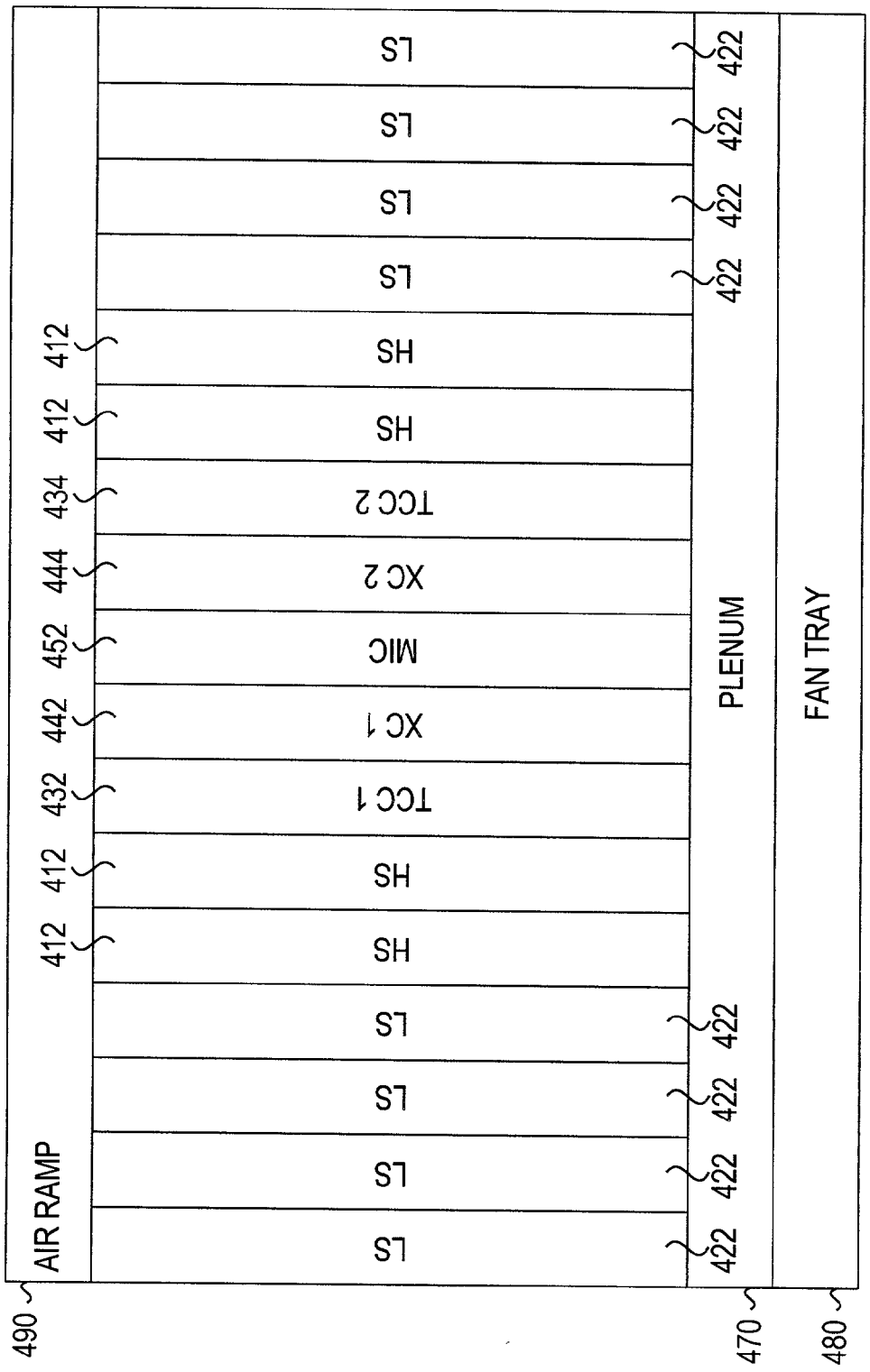
FIG. 4C illustrates the mechanical (rack) configuration of the flexible cross-connect system, according to one embodiment.

FIG. 4C illustrates the NE as a rack with card slots. The plug-in cards are grouped into two general groups. The first group is the common equipment cards, which include a XC card 442, a redundant XC card 444, a TCC card 432, a redundant TCC card 434, and a Miscellaneous Interface Card (MIC) 452. The second group is the network interface cards and includes low speed cards 422 and high speed cards 412, which form the telecommunication plane network interface subsystems 430 and the data plane network interface subsystems 440.

A master architecture of a flexible cross-connect system is defined in co-pending U.S. application Ser. No. 09/274,078 filed entitled "Flexible Cross-Connect with Data Plane" filed on Mar. 22, 1999. The basic software architecture of the flexible cross-connect system is disclosed in co-pending U.S. application Ser. No. 09/533,421 entitled "Method and Apparatus for Controlling the Operation of a Flexible Cross-Connect System" filed on Mar. 22, 2000. The basic timing operations of the flexible cross-connect system are disclosed in co-pending U.S. application Ser. No. 09/532,611 entitled "Method and Apparatus for Routing Telecommunication Signals" filed on Mar. 22, 2000. U.S. application Ser. Nos. 09/274,078, 09/533,421 and 09/532,611 are herein incorporated by reference in their entirety but are not admitted to be prior art.

Figure 3A:
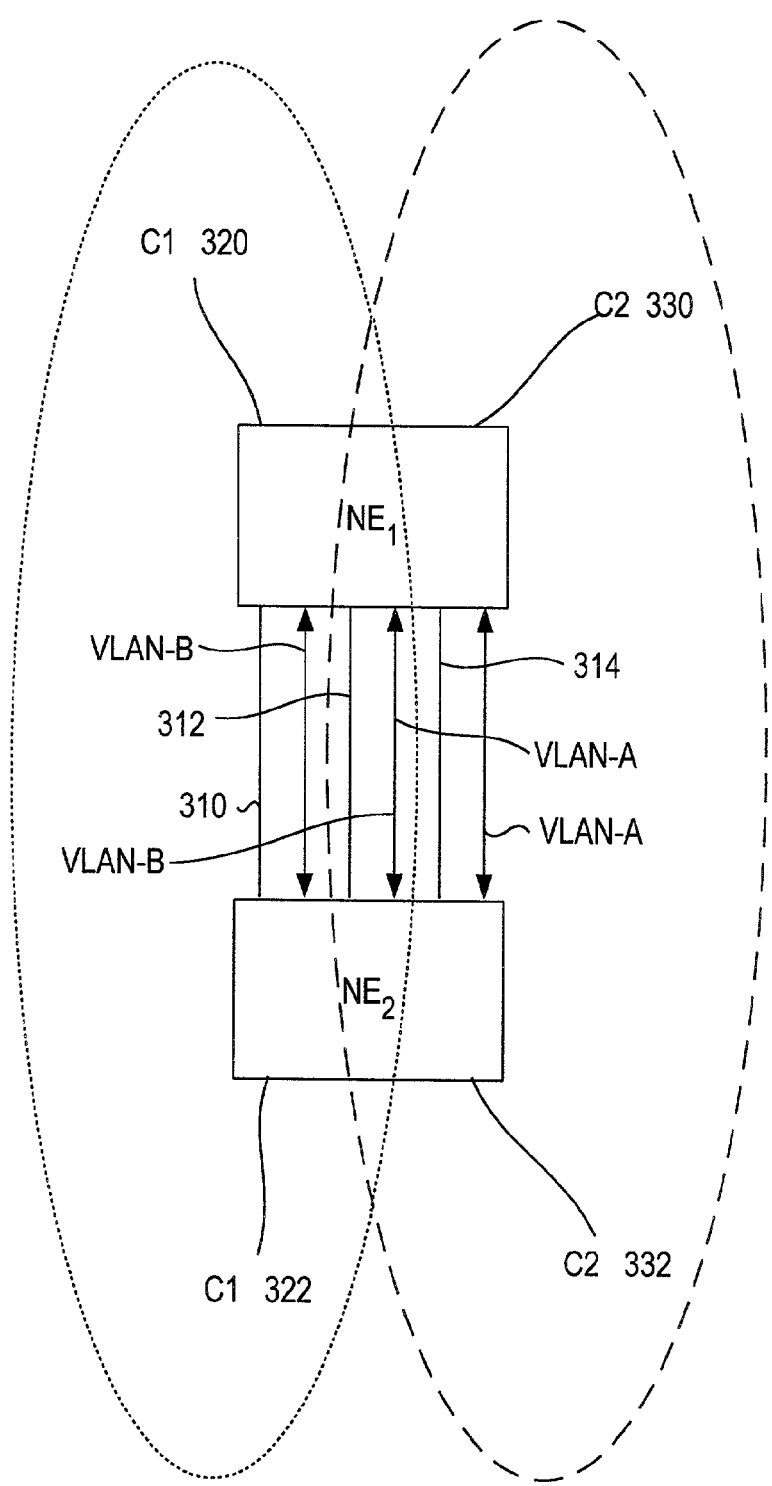
FIGS. 3A and 3B illustrate telecom networks having multiple VLANs assigned to links.
Figure 3B:
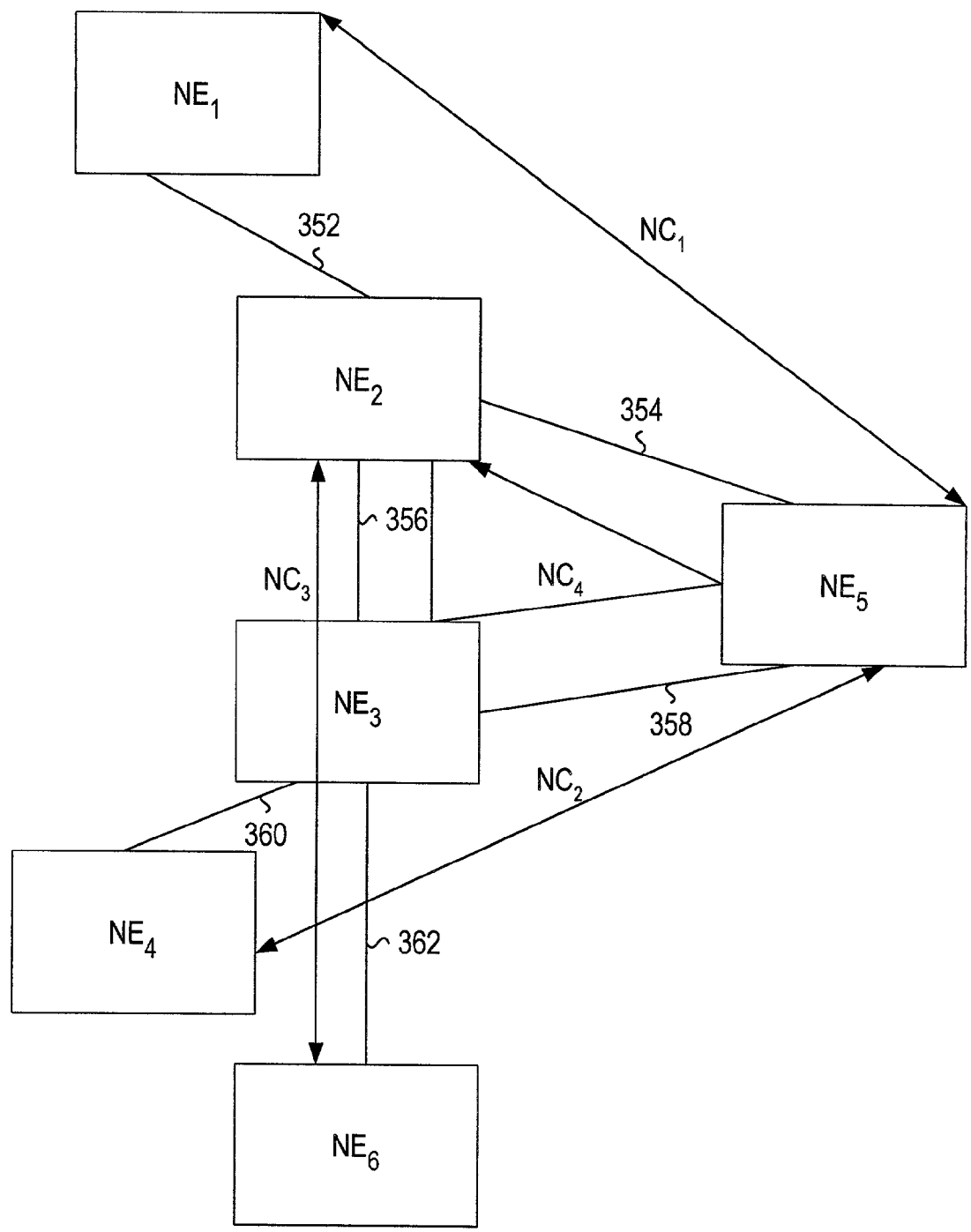

The method and apparatus of the present invention restrict the assignment of VLANs to ensure that the assignment of VLANs does not produce a network topology having an arbitrary mix-and-match of VLANs on links as illustrated in FIG. 3. In fact, the method and apparatus assign VLANS so as to (1) restrict links within a NC from being identified by different sets of VLANs, (2) not inadvertently create a layer 2 forwarding loop, and (3) not inadvertently create a situation where a link will be blocked. Restricting the assignment of VLANs in accordance with the principles of this invention ensures that standard spanning tree protocols can be used for any network topology.

Figure 5:
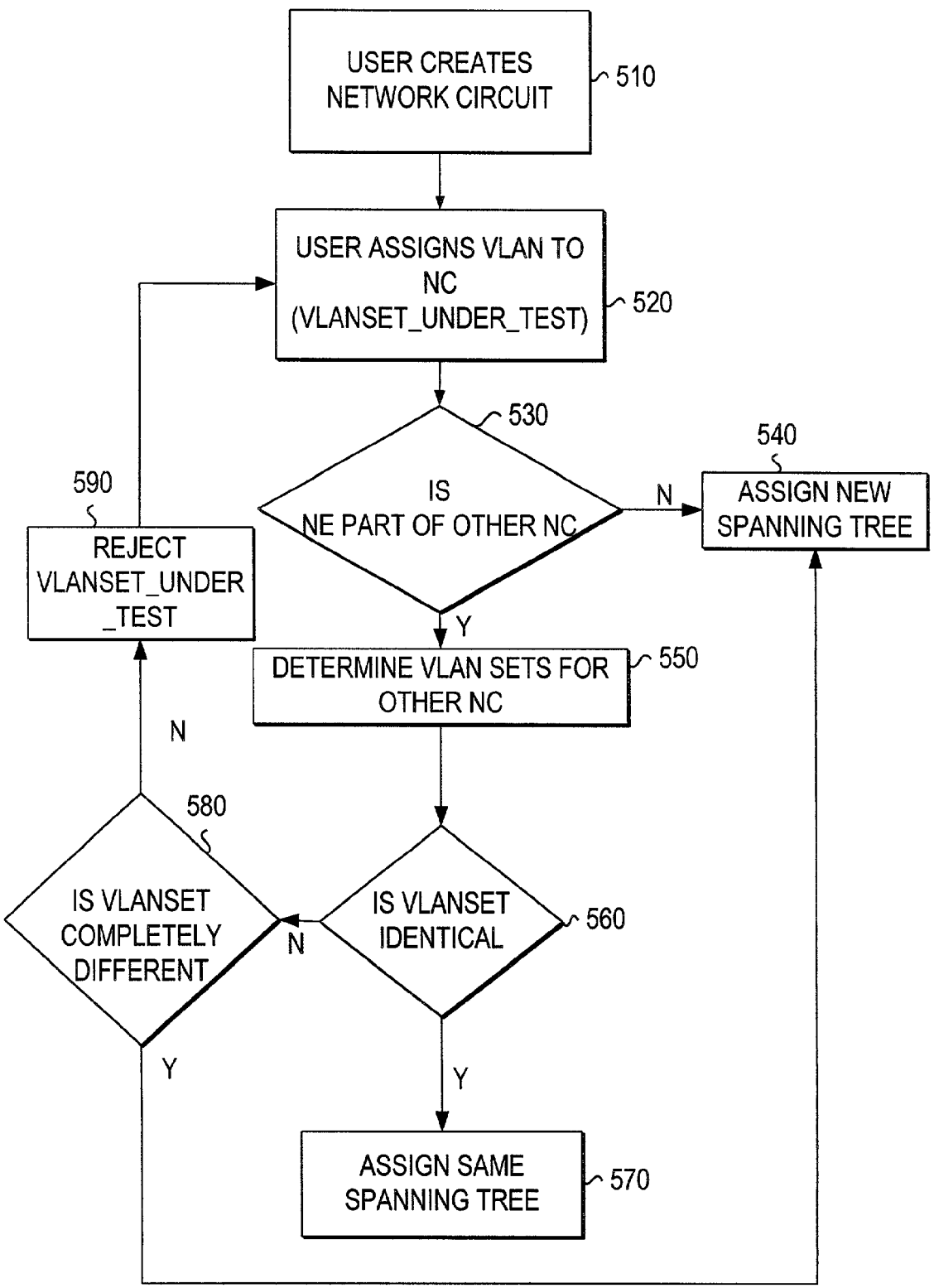
FIG. 5 illustrates a flowchart of a method of the current invention, according to one embodiment.

FIG. 5 illustrates a flowchart of one embodiment of the method for restricting the assignment of VLANs. As illustrated, a user creates a network circuit (NC) at a particular Network Element (NE) (step 510). The user then assigns VLAN(s) to the NC (step 520). The assigned VLAN(s) are used to test if the assignment is valid. Thus, the assigned VLAN(s) is known as VLANSET_UNDER_TEST. A determination is then made as to whether the NE is assigned to other NCs (step 530). If the NE is not part of any other NC, then the VLANSET_UNDER_TEST is valid and a new spanning tree should be assigned to the VLANSET_UNDER_TEST (step 540). In this case, the new spanning tree could be anything as there is no spanning tree assigned to this NE at this point.

If the NE is part of other NCs then VLANSETs for each of the other NCs is identified (Step 550). A determination is then made as to whether any of the other VLANSETs intersect entirely (i.e., are identical) with the VLANSET_UNDER_TEST (step 560). If one of the other VLANSETs intersect entirely with the VLANSET_UNDER_TEST, then the VLANSET_UNDER_TEST is valid and will run the same spanning tree as the VLANSET that is identical (step 570).

If none of the other VLANSETs intersect entirely with the VLANSET_UNDER_TEST, then a determination needs to be made if the VLANSET_UNDER_TEST is distinct from all of the other VLANSETs (step 580).

It would be obvious to one of ordinary skill in the art that rearranging the steps of this method is well within the scope of the current invention. Moreover, there are numerous other methods that could accomplish the same result which are all within the scope of the current invention.

If all other VLANSETs are distinct from VLANSET_UNDER_TEST, then the VLANSET_UNDER_TEST is valid. A new spanning tree will then be assigned to the VLANSET_UNDER_TEST (step 540). The new spanning tree could be anything that was not used before.

If the VLAN_UNDER_TEST is not distinct from all other VLANSETs, then the VLANSET_UNDER_TEST will be rejected (step 590) and the process will return to step 520.

Figure 6A:
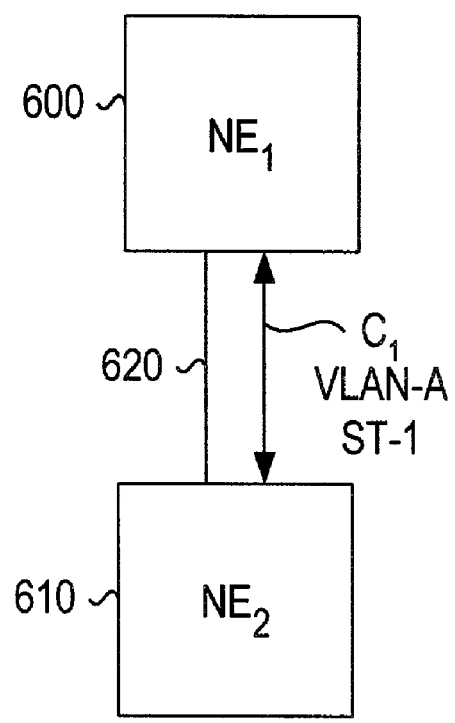
FIGS. 6A–6D illustrates addition of network circuits to a network element, according to one embodiment.

To explain each of the steps of the method of FIG. 5, several examples of adding a NC and assigning the NC a VLANSET follow. FIG. 6A illustrates a user at NE1 600 defining a first circuit C1 that includes NE1 600, NE2 610 and link 620 (step 510). The user then assigns VLAN-A to C1 (step 520). A determination is made that this NE is not part of any other NCs (step 530). Therefore, the VLAN-A assignment is valid and a new spanning tree is assigned (step 540). As illustrated, spanning tree 1 is run for the assigned VLAN-A disseminating from NE1 600.

Figure 6B:
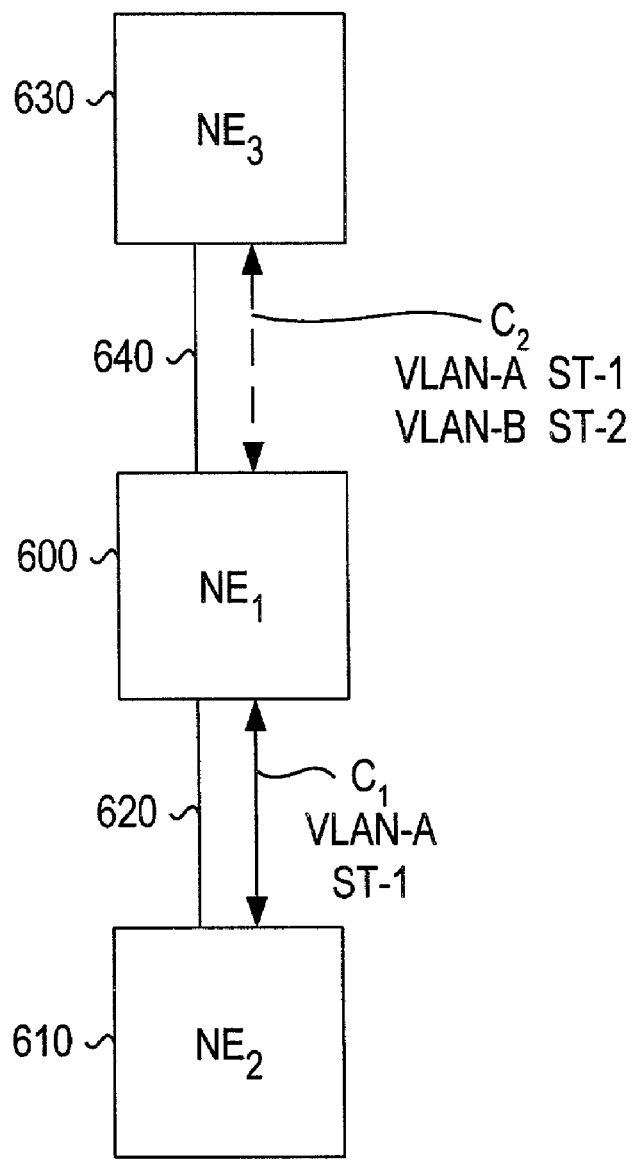

FIG. 6B illustrates a user at NE1 600 defining a second circuit C2 that includes NE1 600, NE3 630 and link 640 (step 510). The user then assigns VLAN-B to C2 (step 520). A determination is made that this NE is also part of C1 (step 530) that is carrying VLAN-A (step 550). A determination is made that VLAN-B for C2 is not identical to any of the other VLANs (i.e., VLAN-A for C1) (Step 560). A determination is then made that VLAN-B is completely separate from VLAN-A (step 580) so that VLAN-B is acceptable and a new spanning tree is assigned (step 540). As illustrated, spanning tree 2 is run for VLAN-B disseminating from NE1 600.

FIG. 6B also illustrates that C2 could be assigned VLAN-A. In this case, a determination would be made in step 560 that VLAN-A for C2 is identical to VLAN-A for C1 (i.e., it is the only VLAN assigned). Therefore, the VLAN-A for C2 would also be assigned spanning tree 1 (step 570). It should be noted that C2 could not be assigned VLAN-A/B as that would create a topology with partially intersecting VLAN sets.

Figure 6C:
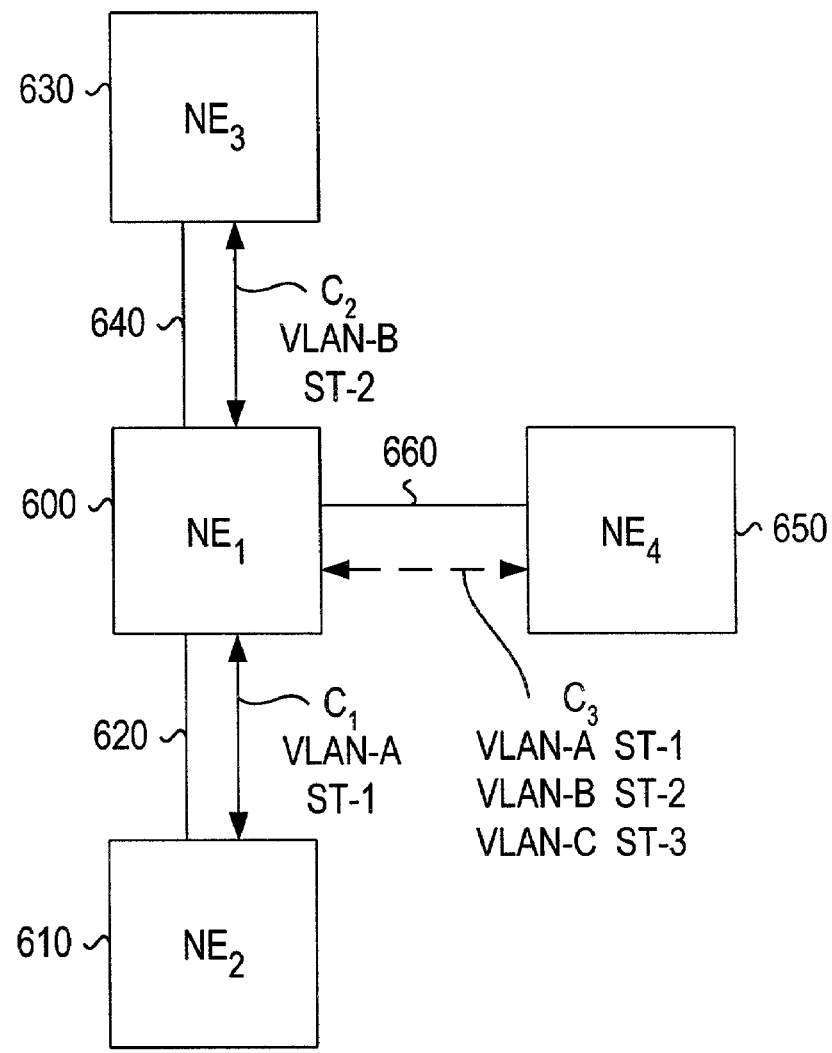

FIG. 6C illustrates a user at NE1 600 defining a third circuit C2 that includes NE1 600, NE4 650 and link 660 (step 510). The user then assigns VLAN-C to C3 (step 520). A determination is made that this NE is also part of C1 and C2 (step 530) that are defined as VLAN-A and VLAN-B respectively (step 550). A determination is made that VLAN-C for C3 is not identical to any of the other VLANs (i.e., VLAN-A for C1 or VLAN-B for C2) (Step 560). A determination is then made that VLAN-C is completely separate from VLAN-A and VLAN-B (step 580) so that the VLAN-C is accepted and a new spanning tree is assigned (step 540). As illustrated the spanning tree assigned to VLAN-C disseminating from NE1 600 is spanning tree 3.

FIG. 6C also illustrates that C3 could be defined as VLAN-A or VLAN-B. In this case, a determination would be made in step 560 that the VLANSET_UNDER_TEST (VLAN-A or VLAN-B) for C3 is identical to VLAN-A for C1 or VLAN-B for C2. Accordingly, the VLAN-A or VLAN-B for C3 would also be assigned spanning tree 1 or spanning tree 2 respectively (step 570). It should be noted that C3 could not be assigned VLAN-A/B, VLAN-A/x, or VLAN-B/x, where x represents another designation.

Figure 6D:
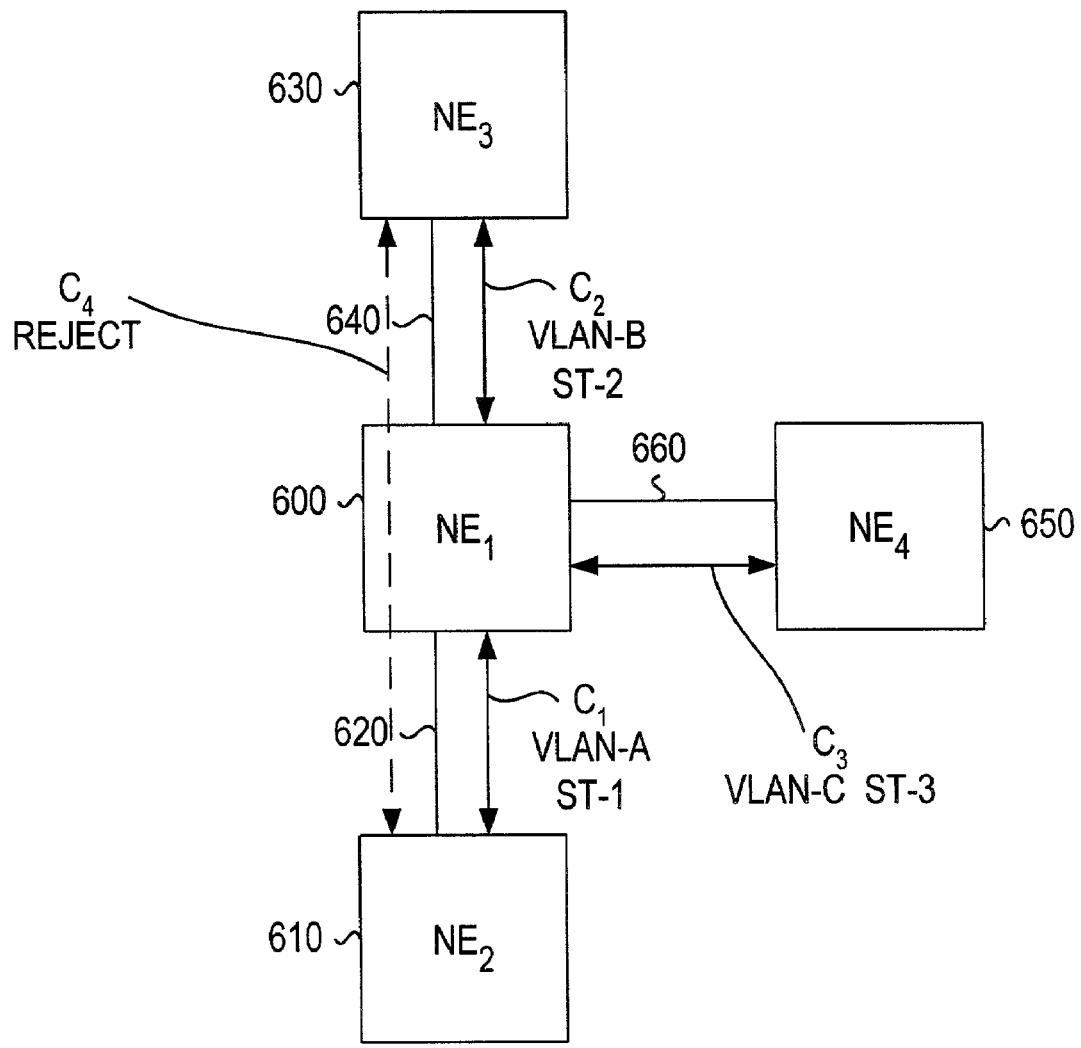

FIG. 6D illustrates a user at NE1 600 defining a fourth circuit C4 that includes NE1 600, link 620, NE2 610, link 640, and NE3 630 (step 510). The user then assigns C4 as VLAN-D (step 520). A determination is made that this NE is also part of C1, C2 and C3 (step 530) that are defined as VLAN-A, VLAN-B and VLAN-C respectively (step 550). A determination is made that VLAN-D for C4 is not identical to any of the other VLANs (step 560). A determination is then made that VLAN-D is completely separate from VLAN-A, VLAN-B and VLAN-C (step 580) so that the VLAN-D is accepted and a new spanning tree is assigned. It should be noted that C4 could be designated A/x or B/x as that would result in the VALN not being completely separate from either VLAN-A or VLAN-B.

Figure 7:
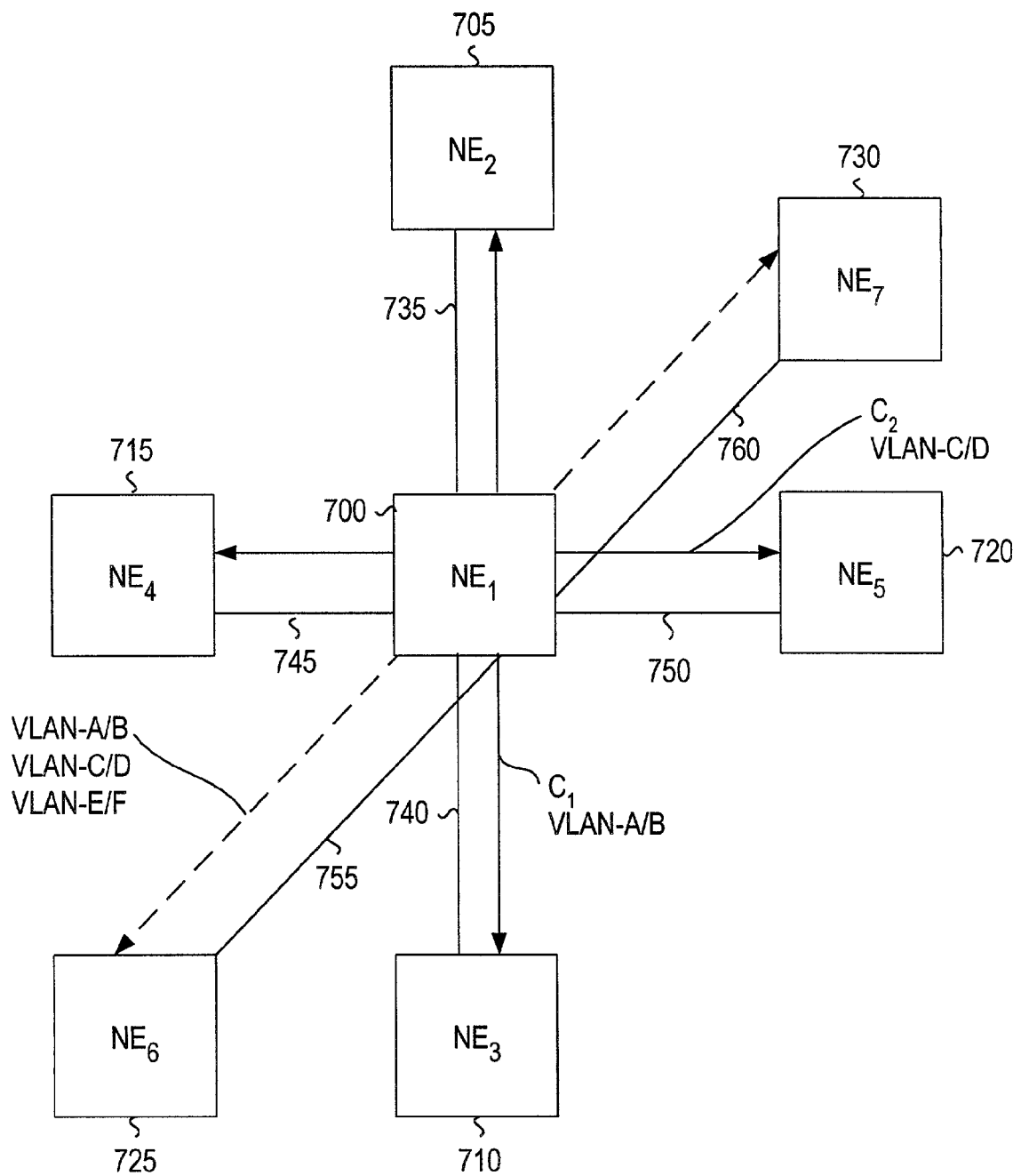
FIG. 7 illustrates addition of network circuit to a network element, according to one embodiment.

FIG. 7 illustrates a first NE1 700 that has two circuits (C1, C2) already defined. C1 includes NE3 710, link 740, NE1 700, link 735, and NE2 705. C2 includes NE4 715, link 745, NE1 700, link 750 and NE5 720. C1 carries VLANs A and B, and C2 carries VLANs C and D. The user now enters a third circuit C3 at NE1. C3 includes NE6 725, link 755, NE1 700, link 760 and NE7 730. In this case, if the user identifies C3 as any new VLAN or VLANSET (i.e., VLAN-E, VLAN-F, VLAN-E/F) or any existing VLANSET (VLAN-A/B, VLAN-C/D), the system will accept the VLAN assignment and run either a new spanning tree or an existing spanning tree for that VLAN or VLANSET, respectively. If the user assigned C3 as any combination of existing VLANs (i.e., VLAN-A, VLAN-B, VLAN-C, VLAN-D, VLAN-A/C, VLAN-A/D, VLAN-B/C, VLAN-B/D), the system would reject the VLAN assignment.

All of the examples illustrate the case where an operator defines a NC for the NE and assigns the NC a test VLAN (i.e., VLANSET_UNDER_TEST) and the system determines if the test VLAN is acceptable and runs a spanning tree associated with the particular VLAN. It is well within the scope of the current invention to have the system tell the operator what VLANs can be assigned, after the user defines the NC, and have the user then select from the available VLANs. It is also within the scope of the current invention for the NE to inform the user of which VLAN assignments are not valid so that the user can select some other VLAN assignment. It is also understood that the system may inform the user that a particular NC cannot be defined if sufficient bandwidth is not available.

The above functions can be implemented as a set of computer instructions stored on a computer readable medium.

Although this invention has been illustrated by reference to specific embodiments, it will be apparent to those of ordinary skill in the art that various changes and modifications may be made, which clearly fall within the scope of the invention. The invention is intended to be protected broadly within the spirit and scope of the appended claims.

What is claimed is:

1. A method for preventing a topology with partially intersecting VLANs, the method comprising:
   receiving information regarding creation of a network circuit;
   receiving information regarding assignment of a test VLAN to the created network circuit;
   retrieving provisioning data including presence of other network circuits and assignments of VLANs to the other network circuits;
   determining if the test VLAN intersects entirely with any of the other assigned VLANs;
   determining if the test VLAN is distinct from all the other assigned VLANs; and
   determining if the test VLAN is acceptable based on said determining if the test VLAN intersects entirely and said determining if the test VLAN is distinct.

2. The method of claim 1, further comprising associating a new spanning tree with the test VLAN, responsive to said determining making a determination that the test VLAN is acceptable.

3. The method of claim 2, wherein the new spanning tree is identical to a previously associated spanning tree, if the previously associated spanning tree is associated with one of the other assigned VLANs which is identical to the test VLAN.

4. The method of claim 2, wherein the new spanning tree is unique if all of the other assigned VLANs are completely distinct.

5. The method of claim 2, wherein the new spanning tree is identical to a previously associated spanning tree associated with one of the other VLANs that is completely distinct, if the one of the other VLANs has an identifier that is identical to an identifier for the test VLAN.

6. The method of claim 3, wherein the test VLAN is accepted if the test VLAN intersects entirely with one of the other VLANs.

7. The method of claim 6, further comprising running a first spanning tree on the test VLAN, wherein the first spanning tree is the same spanning tree run on the VLAN that entirely intersects with the test VLAN.

8. The method of claim 1, wherein the test VLAN is accepted if the test VLAN is distinct from all other VLANs.

9. The method of claim 8, further comprising running an identical spanning tree on the test VLAN if the test VLAN has an identifier that is identical to an identifier for one of the completely distinct VLANs.

10. The method of claim 8, further comprising running a new spanning tree on the test VLAN.

11. The method of claim 1, wherein the test VLAN is rejected if the test VLAN is not distinct from all other VLANs and does not intersect entirely with one of the other VLANs.

12. The method of claim 11, further comprising transmitting the rejection to a user.

13. The method of claim 1, wherein the method is performed at a network element.

14. A computer program embodied on a computer readable medium for preventing a topology with partially intersecting VLANs, the computer program comprising:
a code segment for receiving information regarding creation of a network circuit;
a code segment for receiving information regarding assignment of a test VLAN to the created network circuit;
a code segment for retrieving provisioning data including VLAN assignments for other network circuits;
a code segment for determining if the test VLAN intersects entirely with one of the other VLANs;
a code segment for determining if the test VLAN is distinct from all other VLANs; and
a code segment for determining if the test VLAN is acceptable based on output of said code segment for determining if the test VLAN intersects entirely and said code segment for determining if the test VLAN is distinct.

15. The computer program of claim 14, wherein said code segment for determining if the test VLAN is acceptable accepts the test VLAN if the test VLAN is distinct from all other VLANs or intersects entirely with one of the other VLANs.

16. The computer program of claim 15, further comprising a code segment for running an appropriate spanning tree on the test VLAN.

17. An apparatus for preventing a topology with partially intersecting VLANs, the apparatus comprising:
means for receiving information regarding creation of a network circuit and assignment of a test VLAN to the created network circuit;
means for retrieving provisioning data including VLAN assignments for the other network circuits;
means for determining if the test VLAN intersects entirely with one of the other VLANs;
means for determining if the test VLAN is distinct from all other VLANs; and
means, responsive to said means for determining if the test VLAN intersects entirely and said means for determining if the test VLAN is distinct, for determining if the test VLAN is acceptable.

18. The apparatus of claim 17, wherein said means for determining if the test VLAN is acceptable accepts the test VLAN if
said means for determining if the test VLAN intersects entirely determines that the test VLAN intersects entirely with one of the other VLANs, or
said means for determining if the test VLAN is distinct determines the test VLAN is distinct from all other VLANs.

19. The apparatus of claim 18, further comprising means for running an appropriate spanning tree on the test VLAN.

20. A network device for preventing a network from having a topology with partially intersecting VLANs, the network device comprising:
memory;
one or more network interfaces; and
a processor configured to perform the steps of defining a new network circuit for the network device;
assigning a test VLAN to the new network circuit;
determining assignments of VLANs to other network circuits associated with the network device; and
determining if the test VLAN is acceptable for spanning tree processing;
wherein said determining if test VLAN is acceptable performed by said processor includes
determining if the test VLAN intersects entirely with one of the other VLANs;
determining if the test VLAN is completely distinct from all of the other VLAN assignments; and
rejecting the test VLAN in response to a determination that the test VLAN does not intersect entirely with one of the other VLANs and a determination that the test VLAN is not completely distinct from all of the other VLAN assignments.

* * * * *